United States Patent
Peršič Debenjak et al.

(10) Patent No.: US 12,522,816 B2
(45) Date of Patent: Jan. 13, 2026

(54) METHOD OF SINGLE-STRANDED RNA PURIFICATION

(71) Applicant: Sartorius BIA Separations d.o.o., Ajdovscina (SI)

(72) Inventors: Špela Peršič Debenjak, Dobrovo (SI); Urh Černigoj, Ajdovscina (SI); Darko Dolenc, Vrhnika (SI); Peter S. Gagnon, Las Vegas, NV (US)

(73) Assignee: Sartorius BIA Separations d.o.o., Ajdovscina (SI)

( * ) Notice: Subject to any disclaimer, the term of this patent is extended or adjusted under 35 U.S.C. 154(b) by 605 days.

(21) Appl. No.: 17/918,503

(22) PCT Filed: Apr. 16, 2021

(86) PCT No.: PCT/EP2021/059906
§ 371 (c)(1),
(2) Date: Oct. 12, 2022

(87) PCT Pub. No.: WO2021/209597
PCT Pub. Date: Oct. 21, 2021

(65) Prior Publication Data
US 2023/0142600 A1    May 11, 2023

(30) Foreign Application Priority Data
Apr. 17, 2020   (EP) .................................... 20170191

(51) Int. Cl.
*C12N 15/10*   (2006.01)
(52) U.S. Cl.
CPC .................................. *C12N 15/101* (2013.01)
(58) Field of Classification Search
CPC ................................................... C12N 15/101
USPC ......................................................... 536/25.4
See application file for complete search history.

(56) References Cited

U.S. PATENT DOCUMENTS

| 4,935,342 A | 6/1990 | Seligson et al. |
| 10,030,243 B2 | 7/2018 | Park et al. |

FOREIGN PATENT DOCUMENTS

| EP | 0270017 A2 | 6/1988 |
| EP | 3018208 A1 | 5/2016 |
| JP | S63-154696 A | 6/1988 |
| JP | 2016-530875 A | 10/2016 |
| WO | 2009-100172 A1 | 8/2009 |
| WO | 2014-144767 A1 | 9/2014 |
| WO | 2017-182524 A1 | 10/2017 |
| WO | 2018-096179 A1 | 5/2018 |

OTHER PUBLICATIONS

Baiersdörfer et al., "A Facile Method for the Removal of dsRNA Contaminant from In Vitro-Transcribed mRNA", Molecular Therapy: Nucleic Acids, vol. 15, p. 26-35, (Apr. 2019).
Romanovskaya et al., "High-throughput purification of double-stranded RNA molecules using convective interaction media monolithic anion exchange columns", Journal of Chromatography A, vol. 1278, p. 54-60, (2013).
Urayama et al., "A New Fractionation and Recovery Method of Viral Genomes Based on Nucleic Acid Composition and Structure Using Tandem Column Chromatography", Microbes and Environments, vol. 30 No. 2, p. 199-203, (Jan. 1, 2015).
International Search Report for corresponding Patent Application No. PCT/EP2021/059906 dated Jul. 27, 2021.
Yastrebov et al., "Use of Sodium Pyrophosphate in the Ion-Exchange Chromatography of Oligonucleotides", Chemistry of Natural Compounds, vol. 28, pp. 127-128, (1992).
Office Action from corresponding Japanese Patent Application No. 2022-563099 dated Mar. 18, 2025.

*Primary Examiner* — Ganapathy Krishnan
(74) *Attorney, Agent, or Firm* — Christensen, Fonder, Dardi; Diane E. Bennett; Peter S. Dardi

(57) ABSTRACT

A method of single-stranded RNA purification comprising the steps:
  applying a sample containing single-stranded RNA to a solid phase dominantly or exclusively bearing both primary and secondary amino groups on its surface under conditions sufficient to bind at least predominantly the single-stranded RNA,
  eluting the single-stranded RNA adsorbed on the surface of the solid phase from the solid surface by means of an elution buffer having a higher concentration of comprising soluble pyrophosphate anions than needed for desorbing double-stranded RNA.

20 Claims, 4 Drawing Sheets

METHOD OF SINGLE-STRANDED RNA PURIFICATION

CROSS REFERENCE TO RELATED APPLICATIONS

This application is a National Stage filing of PCT Application No. PCT/EP2021/059906 filed Apr. 16, 2021, entitled "A Method of Single-Stranded RNA Purification", which claims priority to European Patent Application No. 20170191.9, filed Apr. 17, 2020.

The present invention pertains to a method for removing double-stranded RNA from a mixture of double-stranded mRNA and single-stranded mRNA.

BACKGROUND

Synthesis of messenger RNA (mRNA) for gene therapy applications yields preparations that contain undesired subpopulations of double-stranded (ds) RNA in addition to the desired single-stranded (ss) RNA. These dsRNA species form post-synthesis by intrachain interaction of complementary sequences within the base-strand. Formation of dsRNA sequences can also occur by pairing with complementary sequences among neighboring ssRNA molecules, thereby creating non-specific interchain dimers and higher order multimers that may also contain intrachain ds sequences. Double-stranded RNA triggers an unwanted and potentially lethal immune response when injected into a subject, making its removal a particular object of purification.

Messenger RNA preparations also contain residual DNA from the plasmid template used to synthesize the mRNA. Nuclease enzymes are commonly added after transcription to reduce DNA levels but they still leave fragments of varying sizes. Messenger RNA preparations further contain proteins that must be removed to reduce the potential for a clinical subject to mount an immune response against treatment. These proteins include enzymes such as RNA polymerase and nucleases to degrade the DNA plasmid template after transcription. The enzyme preparations themselves further contribute contaminants not removed during their own preparation, including RNA, DNA, DNA-compaction proteins, cell culture and host cell proteins, enzyme fragments, enzyme aggregates, and stable-associations (complexes) among these various species.

Methods for reducing the content of dsRNA from mRNA preparations are known. Levels of dsRNA contamination can be reduced by affinity chromatography on cellulose based chromatography media [1-3]. The mechanism of adsorption has not been defined but dsRNA binds under certain conditions while ssRNA flows through. The method is effective at laboratory scale but it is burdened by low capacity. Low capacity corresponds with large column volumes at manufacturing scale, which require large buffer volumes, large manufacturing areas, and extended process time that depresses productivity of the manufacturing facility. The method also causes dilution of the processed ssRNA, corresponding to an increase of product volume that burdens follow-on purification steps.

Levels of dsRNA may alternatively be reduced by ion-pair reverse phase chromatography (RPC) using a styrene-divinyl-benzene (SDVB) solid phase [4-7]. RPC employs toxic flammable organic solvents that require extremely expensive specialized equipment at industrial scale to mitigate the risk of fire and explosion. RPC also imposes the further burden of safety issues as they pertain to organic solvent toxicity in the work environment and to hazardous waste disposal issues. In addition to the solvent issues, RPC separations often bear the further burden of requiring elevated temperature to obtain the best results.

Anion exchange chromatography has shown utility for purification of small mRNA (<1000 bases) [8]. Anion exchange media evaluated to date include so-called strong anion exchangers, referring to quaternary amine (QA) anion exchangers. So-called weak anion exchangers have also been evaluated, in particular diethylaminoethyl (DEAE) anion exchangers employing a tertiary amine ligand.

Anion exchange chromatography has shown limited utility for removal of DNA and protein contaminants from large mRNA (1,000-10,000 bases) but only at elevated operating temperatures [9]. Elevating the temperature to 65° C. enables elution of large mRNA in a sodium chloride gradient. However, high temperature operation imposes a compound logistical burden since the buffers, samples, and column must all be pre-equilibrated to and maintained precisely at the specified operating temperature for the entire duration of the process, and reproducibly across all batches for the manufacturing life of the product, potentially for years.

SUMMARY OF THE INVENTION

A novel method has been developed for removal of dsRNA from mixed preparations with ssRNA that represents an improvement over known methods.

According to the invention a method is provided of single-stranded RNA purification comprising the steps:
  applying a sample containing single-stranded RNA to a solid phase dominantly or exclusively bearing both primary and secondary amino groups on its surface under conditions sufficient to bind at least predominantly the single-stranded RNA,
  eluting the single-stranded RNA adsorbed on the surface of the solid phase from the solid surface by means of an elution buffer having a higher concentration of comprising soluble pyrophosphate anions than needed for desorbing double-stranded RNA.

In one embodiment of the method of the invention at least one step of washing of the solid phase may be provided after applying the sample and prior to eluting of the single-stranded RNA with a washing buffer at ambient temperature having a higher ionic strength compared to the ionic strength of the elution buffer.

In a further embodiment of the method of the invention the molar ratio of primary amino groups to secondary amino groups can be in the range of 1/10 to 10/1, or 2/10 to 10/2, or 3/10 to 10/3, or 4/10 to 10/4, or 5/10 to 10/5.

In still a further embodiment of the method of the invention desorbing of double-stranded RNA adsorbed on the surface of the solid phase from the solid surface is achieved by means of a buffer having a lower concentration of pyrophosphate anions than needed for eluting single-stranded RNA.

In another embodiment of the method of the invention eluting of the single stranded RNA from the solid phase can occur at a pyrophosphate concentration in the range of 1 mM to 1000 mM, or 1 mM to 500 mM, or 1 mM to 200 mM, or preferably in the range of 1 mM to 100 mM. In particular, the pyrophosphate may be applied in a buffer as a gradient from a lower value to a higher concentration.

In still another embodiment of the method of the invention a chelating agent can be present in the essentially aqueous mixture.

In yet another embodiment of the method of the invention a chelating agent is present in an environment of the surface of the solid phase prior to the contacting of the aqueous mixture.

Typically, the chelating agents can be independently selected from the group consisting of ethylenediaminetetraacetic acid (EDTA), citric acid, ethylene glycol-bis(2-aminoethylether)-N,N,N',N'-tetraacetic acid (EGTA), tris(2-aminoethyl)amine (TREN), phosphoric acid, citric acid, and combinations thereof.

In another embodiment of the method of the invention the ionic strength of the washing buffer can be in the range of 0.5 M to 12 M, or 1 M to 12 M, or 2 M to 12 M, or 4 M to 12 M, or 6 M to 12 M.

In a further embodiment of the method of the invention the washing buffer comprises a chaotropic salt, in particular selected from the group consisting of guanidinium salts, thiocyanates, perchlorates and combinations thereof.

Typically, the desired single-stranded RNA is of size in the range of 1000 bases to 25,000 bases.

Subject matter of the present invention is the use of a solid phase dominantly or exclusively bearing both primary and secondary amino groups on its surface for single-stranded RNA purification, in particular for separating double-stranded RNA from single-stranded RNA in a mixture containing both, which separating employs soluble pyrophosphate anions.

The method of the invention is pertinent to all RNA preparations but particularly to large and very-large RNA, such as in the size range of 1,000-25,000 bases. The method enables elution of ssRNA from a solid phase bearing a mixture of primary amino groups and secondary amino groups by means of an increasing gradient of pyrophosphate anions. It works at ambient temperature without requiring the use of organic solvents or chaotropic agents. More particularly, dsRNA elutes earlier in a lower concentration of pyrophosphate anions and ssRNA eluting later at a higher concentration of pyrophosphate anions. The pyrophosphate anions may be applied in form of a salt such as tetrasodium pyrophosphate, or tetrapotassium pyrophosphate, or a salt formed of pyrophosphate anions with a different cation, or a mixture of salts comprising pyrophosphate anions and different cations.

The surprising nature of the method is highlighted by the fact that it teaches against the prior art. Published art teaches that elution of large ssRNA from positively charged solid phases (anion exchangers) with salt gradients at ambient temperature is impossible. The surprising nature of the invention is further highlighted by the fact that ssRNA and dsRNA in any given transcription mixture are compositionally identical, which creates an expectation of similar behavior.

The unexpected ability of pyrophosphate anions to separate dsRNA from ssRNA using a solid phase bearing a mixture of primary amino groups and secondary amino groups might be assumed to reflect the higher electrostatic (charge) valency of pyrophosphate (4-) compared to salts comprising monovalent ions like chloride (1-). Monovalent chloride salts cannot elute ssRNA from known strong or weak anion exchangers at neutral pH and ambient temperature. Neither can divalent anion (2-) salts at neutral pH such as sulfate or phosphate. Neither can trivalent anion (3-) salts such as citrate at mildly alkaline pH. Neither can chaotropic salts of any charge state. However, the assumption that pyrophosphate works because of its higher charge valency is proven false by the failure of tetravalent (4-) ethylenediaminetetraacetate (EDTA) to achieve elution at neutral pH. Experimental data further show that pyrophosphate anions are unable to elute ssRNA from strong anion exchangers such as QA or weak anion exchangers such as DEAE. This compounds the lack of understanding of how pyrophosphate anions achieve separation of dsRNA from ssRNA on solid phases bearing mixtures of primary amino groups and secondary amino groups. Accordingly, no theory has been developed concerning the specific mechanism or mechanisms by which pyrophosphate anions achieve separation of dsRNA from ssRNA, how pyrophosphate elutes large RNA at all, or why it does so only on solid phases bearing a mixture of primary and secondary amino groups.

It is recommended that chelating agents be used to enhance the quality of ssRNA prepared by the invention. This may be achieved by using buffers that are themselves chelating agents, such as phosphate and citrate among others, or by adding chelating agents such as EDTA and EGTA among others.

Another unexpected feature of the invention is that a large portion of contaminating dsRNA can be removed from the solid phase of the invention by introducing high concentrations of non-pyrophosphate salts in advance of separating remaining trace levels of dsRNA from ssRNA by means of an increasing gradient of pyrophosphate anions. Preferred salts for performing such advance reduction of dsRNA especially include chaotropic salts since they tend to maintain solubility of RNA. The technique of reducing contaminant loads in advance of eluting a product of interest is known but limited to salt concentrations that are lower than the concentration of salts required to elute the product of interest. The present version of using a pre-elution wash is distinct because it works by applying non-pyrophosphate salts at much higher concentrations than the concentration of pyrophosphate salts used to separate dsRNA from ssRNA. For example, where dsRNA and ssRNA are separated from each other in a pyrophosphate gradient that typically ends at 100 mM pyrophosphate or less, advance washes with chaotropic salts may be conducted at up to 6 M guanidine-HCl, or 12 M guanidine thiocyanate.

Beyond simply displacing the majority of dsRNA in advance of eluting ssRNA with pyrophosphate anions, advance washes with high concentrations of chaotropic salts offer a unique opportunity to dissociate otherwise-stable complexes between ssRNA and contaminants. This provides a solution to a challenge in the field that is only beginning to be recognized. Nucleic acids frequently exist in stable complexes with contaminants. Some of those complexes elute under the same or nearly the same conditions as pure nucleic acid. These complexes accordingly represent Trojan Horses that smuggle contaminants into what should be the pure ssRNA elution fraction, even though the properties of the independent contaminants should preclude that possibility. Washes with high concentrations of chaotropic washes offer the possibility to suspend that contamination pathway. The complex-dissociative potential of advance washes with chaotropic salts can be enhanced by the presence of chelating agents.

The inability of contaminating dsRNA to bind a solid phase bearing a mixture of primary amino groups and secondary amino groups in high concentrations of non-pyrophosphate salts also enables a workflow simplification that rivals a technique known in the art as affinity chromatography. Affinity chromatography is a technique in which a biospecific ligand such as an antibody is covalently affixed to a solid phase. When a contaminated sample bearing the target of that antibody is applied to the solid phase, only the target molecule is captured while the contaminants are eliminated by flowing through the column. After washing the column to rinse away trace levels of unbound contaminants, the target molecule is eluted in a single highly purified fraction. The solid phase of the invention achieves precisely this result. Sample contaminated with dsRNA is loaded in high salt at neutral pH. The majority of the dsRNA flows through the column and is thereby eliminated. Highly purified ssRNA is eluted in a concentrated fraction by elution with pyrophosphate.

It will be recognized by persons of experience in the art that this workflow simplification represents a minor procedural variation employing the same principal employed in the basic configuration of the invention, that principal being that dsRNA is unbound by the primary amino solid phase in the presence of high concentrations of salt.

A final surprising feature of the invention is that the elution behavior of contaminants differing in composition from RNA elute similarly to dsRNA but differently from ssRNA. Such contaminants include proteins and DNA, both of which elute at lower concentrations of pyrophosphate than ssRNA in pH gradients. The majority of them are also removed by salts applied to the solid phase in advance of separating their trace residues from ssRNA by means of an ascending gradient of pyrophosphate anions.

General Description of the Invention

In a general aspect, the invention is a solid phase extraction method for removal of double-stranded messenger RNA (dsRNA) from a preparation containing a mixture of dsRNA and single-stranded messenger RNA (ssRNA).

In a specific aspect, the invention is related to the elution of mRNA from a solid phase bearing a mixture of primary amino groups and secondary amino groups where dsRNA is separated from ssRNA by virtue of dsRNA eluting at a lower concentration of pyrophosphate anions than ssRNA.

In a more specific aspect, the invention is related with the separation of dsRNA and ssRNA by pyrophosphate anions over a range of concentration of 1 mM-1000 mM, or 1 mM to 500 mM, or 1 mM to 250 mM, or 1 mM to 200 mM, or 1 mM to 100 mM, or 5 mM to 100 mM, or 10 mM to 100 mM or 20 mM, or a higher range, or a lower range, or an intermediate range. A range of pyrophosphate anions is specified because the amount required to elute a particular ssRNA will depend upon its size, with smaller ssRNA molecules eluting at lower pyrophosphate concentrations than larger ssRNA molecules.

In another specific aspect, elution of bound ssRNA from a solid phase bearing a mixture of primary amino groups and secondary amino groups with pyrophosphate gradient may be conducted at a pH ranging a value of less than pH 3.0 to more than pH 11.0, or pH 5.0 to pH 11.0, or pH 6.0 to pH 11.0, or pH 6.5 to pH 10.5, or pH 7.0 to pH 10, or pH 7.5 to pH 9.5, or pH 8.0 to pH 9.0, or a higher, lower, or intermediate range but preferably in the range of pH 5.5 to pH 8.5 and more particularly in the range of pH 6.5 to pH 7.5. A range is specified because pH works synergistically with pyrophosphate such that the amount of pyrophosphate required to elute ssRNA of a particular size can be reduced by increasing pH.

In some embodiments, pH and pyrophosphate concentration can be varied simultaneously. In some such embodiments, pyrophosphate and pH can be increased in parallel. In other such embodiments, pyrophosphate and pH can be increased in an antiparallel fashion. In other such embodiments, pH can be held constant while pyrophosphate concentration is increased. In other such embodiments, pH can be increased while pyrophosphate concentration is held constant.

In another specific aspect, a non-pyrophosphate salt may be combined with pyrophosphate during elution. In some embodiments, the non-pyrophosphate salt may be a chloride salt at a concentration of 10 mM to 2000 mM, or 50 mM to 1000 mM, or 100 mM to 500 mM, or a higher, lower, or intermediate range, but preferably in the range of 100 mM to 1000 mM. In other embodiments, the non-pyrophosphate salt may be a sulfate salt, or a phosphate salt, or chaotropic salt such a guanidine-HCl, or guanidine thiocyanate, among others, or a chelating salt, at concentrations up to saturation.

In another aspect, the invention is related with a method in which ssRNA bound to a solid phase bearing a mixture of primary amino groups and secondary amino groups is washed with non-pyrophosphate salts before eluting the ssRNA with pyrophosphate anions. In one embodiment, the species of non-pyrophosphate salt is preferably a chaotropic species of salt such as guanidine hydrochloride, or potassium thiocyanate, or guanidine thiocyanate, at a concentration of 100 mM to saturation, or 500 mM to saturation, or 1 M to saturation, or 2 M to saturation, or 4 M to saturation, or 6 M to saturation, or a higher, lower, or intermediate range.

In another aspect, the invention is related with a method in which ssRNA bound a solid phase bearing a mixture of primary amino groups and secondary amino groups is washed with a chelating agent, optionally in conjunction with a pre-elution salt wash, before eluting the ssRNA with pyrophosphate. In one embodiment, the chelating agent may be of any species of chelating agent, or a mixture of species of chelating agents, at any concentration, including up to full saturation. In one such embodiment, the chelating agent may be ethylenediaminetetraacetic acid (EDTA) at a concentration of 2 mM to 200 mM, or 5 mM to 100 mM, or 10 mM to 50 mM, or 20 mM to 25 mM, or a lower, or intermediate range, or a higher range up to full saturation. In closely related embodiments, the chelating agent may be a salt of ethylene glycol-bis(2-aminoethylether)-N,N,N',N'-tetraacetic acid (EGTA), or tris(2-aminoethyl)amine (TREN), phosphoric acid, citric acid, or another chelating agent, or a mixture of chelating agents over the same range of concentrations described for EDTA.

In one embodiment, ssRNA is eluted from a solid phase bearing a mixture of primary amino groups and secondary amino groups at neutral pH by means of a continuous gradient of pyrophosphate anions, also known in the art as a linear gradient, referring to a gradual continuous increase of pyrophosphate concentration. In a closely related embodiment, the concentration of pyrophosphate anions may be changed in increments or steps, creating what is known in the art as a step gradient. In another closely related embodiment, the concentration of pyrophosphate anion may be changed in a single step.

In one embodiment of the invention, treatment with non-pyrophosphate salts may include any of the following: the addition of salts to the sample, buffer exchanging the sample into a salt-containing buffer, buffer exchanging the sample into a salt-containing buffer, and employing salt-containing buffers to conduct the steps of the method, including elution of the ssRNA. In some such embodiments, the species of salts and/or their concentrations may differ at each step of the method.

It will be recognized by persons of experience in the art that RNA precipitates at elevated concentrations of certain non-chaotropic salts including but not limited to sodium chloride, potassium chloride, and lithium chloride. It will be understood that non-chaotropic salt concentrations that precipitate RNA should be avoided during sample application and elution of the ssRNA. It may be useful to apply such salts during a wash that follows sample application since it may help to displace non-ssRNA species from the solid phase. In most such cases however, the use of chaotropic salts will be preferred because they embody less tendency to cause RNA precipitation, which also qualifies their use during sample loading and/or elution, if desired.

In one embodiment of the invention, treatment with chelating agents may include any of the following: the addition of chelating agents to the sample, buffer exchanging the sample into a metal ion-free buffer, buffer exchanging the sample into a chelated buffer, and employing metal ion-free or chelated buffers to conduct the steps of the method, including elution of the ssRNA. In some such embodiments, the species of chelating agents and/or their concentrations may differ at each step of the method.

In one embodiment of the invention, treatment with non-pyrophosphate salts and/or chelating agents may include any of the following: the addition of salts and chelating agents to the sample, buffer exchanging the sample into a salt- and/or chelating agent-containing buffer, buffer exchanging the sample into a salt- and/or chelating agent-containing buffer, and employing a salt-containing buffer and/or chelating agent-containing buffers to conduct the steps of the method, including elution of the ssRNA. In some such embodiments, the species of salts, chelating agents, and their respective concentrations may differ at each step of the method.

The method of the invention may be practiced using any device which is customary in the art, e.g. a solid phase bearing a mixture of primary amino groups and secondary amino groups can be arranged in a chromatography device. The chromatography device can be a monolith, a column of packed particles, a column of packed nanofibers, woven nanofibers, a membrane adsorber, or a hydrogel.

The method of the invention may be employed for purpose of performing analytical or preparative applications. It is applicable to all mRNAs but especially valuable for mRNAs containing more than 1000 bases and potentially up to 25,000 bases. The specific chromatography conditions may vary according to the size of the RNA and the contaminant distribution in the applied sample. Adjusting the specific conditions to achieve the best analytical or preparative results for any particular ssRNA species employs the same experimental skills known to practitioners of the art of chromatography for decades.

The method may be followed by any of a variety of methods to eliminate residual pyrophosphate. Such methods may include treatment of the sample with a pyrophosphatase enzyme to break the pyrophosphate down into simple organic phosphate compounds. However, any reagent added to a purified or partially purified product must itself be absent from the final formulation. Accordingly, it will be preferable in most cases to eliminate residual pyrophosphate with a follow-on method that also has the effect of increasing the purity of the ssRNA. In one such embodiment, the method of the invention may be followed by other processing methods known to offer utility for reducing contaminant loads in ssRNA preparations. Candidates include but are not limited to hydrophobic interaction chromatography, reverse phase chromatography, cellulose-affinity chromatography, affinity chromatography with Oligo dT ligand, size exclusion chromatography, dialysis, and diafiltration, among others.

DETAILED DESCRIPTION OF THE INVENTION

The term "primary amino group" describes a positively charged nitrogen atom linked by a single covalent bond to each of two hydrogen atoms, and also linked by a single covalent bond to a carbon atom. The terms "primary amine" and "primary amine residue" and "primary amine ligand" may be used interchangeably with the term "primary amino group."

The term "secondary amino group" describes a positively charged nitrogen atom linked by a single covalent bond to one hydrogen atom, and also linked by single covalent bonds to each of 2 carbon atoms. The terms "secondary amine" and "secondary amine residue" and "secondary amine ligand" may be used interchangeably with the term "secondary amino group."

The term "solid phase bearing a mixture of primary amino groups and secondary amino groups" refers to a solid surface to which primary amino groups and secondary amino groups are covalently attached. Tertiary amino groups and quaternary amino groups are preferably absent or represent a minority of amino groups. Negatively charged residues should be absent. Uncharged hydrophobic or hydrogen bonding residues may be present.

Amino groups may be covalently linked directly to a solid phase through the ligand carbon atom. Alternatively, they may be linked indirectly to the solid phase by covalent attachment to a so-called spacer arm that is covalently linked to the solid phase. Amino groups may also be part of a more complex structure such as a diamino group, a triamino group, a tetraamino group, etc., or a polymer with repeating amino groups.

The term "solid phase" may refer to a chromatographic solid phase in the form of one or more porous membranes, one or more fibers, one or more porous or non-porous particles, or a monolithic solid phase, including monoliths synthesized from a single polymer mixture, or so-called hydrogels which represent monoliths synthesized first as a macro-skeleton with a secondary ligand-bearing polymer phase synthesized on top of it. Solid phase materials may be provided in a housing to facilitate performance of chromatography. Chromatographic solids phases in housings are commonly referred to as chromatographic devices and often as chromatography columns, or simply columns.

Chromatographic solid phases that bear mixtures of primary amino groups and secondary amino groups are known and available commercially. One example is marketed under the name Toyopearl NH2-750F, manufactured by Tosoh Biosciences, where "NH2" refers to a primary amino group. [www.separations.eu.tosohbioscience.com/solutions/process-media-products/bymode/ion-exchange/anion-exchange/toyopearl-nh2-750f]. Marketing materials indicate that the primary amino group is in the form of a polyamine, meaning that it is a polymer with repeating primary amine subunits affixed covalently to the solid phase. Such polymers are typically linked to the surface of the solid phase through one or more of their primary amino groups. This linkage has the effect of converting the linking amino residues from primary amino groups to secondary amino groups, thereby producing a mixture of primary amino groups and secondary amino groups on the surface of the solid phase.

Another example is manufactured by Sartorius under the name Sartobind STIC PA, where "PA" refers to the primary amine [www.sartorius.com/shop/ww/en/usd/sartobind-stic®-pa/c/M_Sartobind_STIC_PA]. Marketing materials indicate that the primary amino group is in the form of a polymer, specifically polyallylamine, with repeating primary amino subunits, affixed covalently to the solid phase. As noted above covalent attachment of a primary amino polymer to a solid phase has the effect of converting the linking amino residues from primary amino groups to secondary amino groups, thereby producing a mixture of primary amino groups and secondary amino groups on the surface of the solid phase.

Another example is manufactured by J. T. Baker under the name Bakerbond PolyPEI and marketed through VWR [in.vwr.com/store/product/21666435/ion-exchange-chromatography-media-j-t-baker-bakerbond]. A solid phase surface bearing polyethyleneimine (PEI) represents an example of a solid phase dominated by secondary amino groups but still including primary amino groups. Linear PEI polymers bear primary amino groups at their termini but secondary amino groups at each repeating node of the linear polymer. Branched PEI polymers have a higher proportion of primary amino groups since there is one at the terminus of every branch, however there is also a tertiary amine at the base of every branch.

Another example is manufactured by BIA Separations under the name CIMmultus EDA, where EDA refers to ethylene diamine [www.biaseparations.com/en/products/monolithiccolumns/products-for-preparative-applications/111/eda-aex-activated]. Solid phase surfaces bearing EDA represent a balance of primary amino groups and secondary amino groups, slightly favoring secondary amines.

All major commercial producers of chromatographic solid phases manufacture products with amino derivatives on their surfaces, including anion exchangers, indicating the requisite knowledge and resources in the field to produce primary amine-bearing solid phases on a regular or experimental basis.

Given that chromatographic solid phases may not be named in a manner that clearly reveals their composition, it will be useful to have an analytical method to determine if a given solid phase has appropriate characteristics to practice the invention. One simple method for making this determination is to equilibrate the chromatographic solid phase in question with a buffer such as 50 mM Tris, pH 7.5, then inject a sample consisting of ssRNA of a particular size greater than 1000 bases or combination of sizes including at least one species of a size of at least 1000 bases. Reference materials of this nature are commercially from common suppliers such as Thermo Scientific and New England BioLabs. After sample injection and a brief wash with equilibration buffer to displace unbound sample components, elute the chromatography device with a linear gradient from 0 mM tetrapotassium pyrophosphate to 100 mM tetrapotassium pyrophosphate. Chromatography devices suitable for practicing the invention will elute ssRNA within the pyrophosphate gradient. This is discussed in Example 1 and illustrated in FIG. 1.

The term "RNA size" or "size of RNA" refers to the number of nucleotide bases in the nucleotide strand. Bases are commonly noted as "b". Thus the designation 100b refers to an RNA strand of 100 bases. RNA size is independent of RNA conformation, referring to single-stranded (ssRNA) and double-stranded (dsRNA). A given in vitro transcription mixture, referring to the mixture of reagents and product and byproducts produced during transcription of mRNA from a DNA template may contain both ssRNA and dsRNA, but both will be of the same size with respect to the number of bases because both are derived from the same DNA plasmid.

The term "pyrophosphate" or "pyrophosphate anion" refers to phosphorus oxyanions that contain two phosphorus atoms in a P—O—P linkage. Pyrophosphates are often referred to as diphosphates. The structure of the pyrophosphate anion is shown below. Common examples of pyrophosphate salts include tetrasodium pyrophosphate ($Na_4P_2O_7$) and tetrapotassium pyrophosphate ($K_4P_2O_7$).

The term "equilibrated" or "equilibration" refers to a chemical conditioning step having been performed on the solid phase and/or on the sample to create a specific chemical environment. Solid phases are customarily conditioned by exposing them to a buffer that embodies the desired pH and salt composition. Samples are customarily conditioned by titration of pH, sometimes by dilution to reduce the salt concentration, and sometimes by buffer exchange techniques including by chromatography, or by dialysis, or by diafiltration with tangential flow filtration membranes. All of these methods and the criteria for choosing one or another have been known in the art for decades.

The term "loading" or "sample application" refers to the process of bringing the equilibrated sample into contact with the equilibrated solid phase. This is usually done with chromatography devices by causing the sample to pass through the device by means of an external force, such as by gravity or by pumping.

The term "adsorption" refers to the process of binding a biological product to a chemically complementary surface. Adsorption is distinct from "absorption" which can be likened to uptake of water by a sponge through the physical action of capillarity but not involving a chemical interaction. Complementarity in the present case is understood to involve electrostatic charge. The negative electrostatic charge on the surface of RNA mediates its adsorption to the surface of a solid phase that has been rendered electropositive by virtue of the primary amino groups on its surface. Adsorption of biological products is often referred to by the more familiar term "binding".

The term "selective adsorption" refers to conditions that permit adsorption of at least one species while preventing adsorption of one or more other species. In the present case, operating conditions may be adjusted to prevent the binding of the majority of dsRNA while permitting ssRNA to bind.

The term "desorption" refers to the process of releasing a biological product from a chemically complementary surface to which it has been previously adsorbed. For the method of the invention, the concentration of pyrophosphate required to desorb a particular ssRNA molecule will depend on its size, with larger sizes requiring a higher concentration of pyrophosphate. Increasing pH will have the effect of causing desorption to occur at a lower concentration of pyrophosphate. Inclusion of non-pyrophosphate salts will also have the effect of causing desorption to occur at a lower concentration of pyrophosphate. However, non-pyrophosphate salts are unable to elute ssRNA in the absence of pyrophosphate salts.

The term "selective desorption" refers to situations in which one or more adsorbed species are released from the solid phase surface by a change in the conditions that leaves one or more other species still adsorbed. A yet-different set of conditions can then be applied to release a different subset of species from the solid phase surface. In one such instance, contaminating proteins and dsRNA might be eluted from the solid phase by application of a high concentration of salt at neutral or near neutral pH while ssRNA remains bound. Those contaminants would be said to have been selectively desorbed. The ssRNA would be selectively desorbed in a follow-on with pyrophosphate, possibly in the presence of a non-pyrophosphate salt, possibly concurrent with a change of pH.

The term "washed" refers to a process of exposing the loaded column to clean buffer for the purpose of displacing unbound species from pores or channels within the device. The term "rinsed," in the present context, has the same meaning. In the most basic case, the wash buffer has the same formulation as the equilibration buffer. In more complex configurations, a wash buffer may have the additional role of chemically releasing a subset of weakly bound contaminants from the solid phase so that they can be removed before the desired product is eluted. Or there may be more than one washing step where the first employs conditions identical to the equilibration buffer but the second employs conditions that displace a subset of weakly bound contaminants from the solid phase so that they can be removed before elution. Washing can also be used to transition to a buffer that will enable elution under a different or more controlled set of conditions. For example, after a contaminant-displacing non-pyrophosphate-salt wash, it may be desirable to perform a no-salt wash to set up the conditions to elute ssRNA in a pyrophosphate gradient. Lacking that wash, elution would begin by default at a high concentration of non-pyrophosphate salt, creating a gradient in the concentration of a non-pyrophosphate salt that descends while the concentration of pyrophosphate ascends.

The term "elution" represents a special case of the term "desorption" pertinent to the field of chromatography. It refers to a process of changing the chemical environment in which the solid phase resides to cause dissociation of the interaction between the primary amino solid phase and the species that remain bound after the load and wash steps. With dsRNA and proteins removed from the solid phase, ssRNA may be eluted by a simple increase pyrophosphate concentration Elution may be conducted in one or a series of steps in which each step decreases the strength of the interaction between the solid phase and the ssRNA. Changes in conditions may also be made in a continuous or linear manner, causing weakly bound species to be desorbed early in the continuum while strongly bound species elute later in the continuum. Whether in a step or linear format, changes in operating conditions are commonly referred to as gradients and particularly as elution gradients. Step gradients are often considered more convenient but linear gradients typically support better reproducibility.

The term "ambient temperature" is generally considered analogous to the expression "room temperature" or "ordinary temperature". It typically corresponds to a temperature in the range of about 20-22° C. but may also include a broader range such as about 18-25° C.

The term "chaotropic salt" refers to a salt species for which at least one of its constituent ions has a high chaotropic ranking in the Hofmeister series of lyotropic and chaotropic ions. Lyotropic ions reside at one end of the Hofmeister series. Chaotropic ions populate the opposite end of the series. Chaotropic ions are often described as being preferentially bound by biomolecules. Chaotropic salts have the effect of relaxing non-covalent interactions within and among biomolecules, sometimes to the extent of destabilizing overall structure and dissociating interactions among the respective elements in multicomponent noncovalent mixtures. They usually have the effect of increasing solubility. Examples of chaotropic salts include guanidinium salts, thiocyanates, and perchlorates, among others. In some cases, both the anion and cation of a particular salt are strongly chaotropic as in the case of guanidine thiocyanate. Such salts have more chaotropic potential than salts including only a chaotropic anion or chaotropic cation. Lyotropic ions reside at the opposite end of the Hofmeister series. They are often described as being preferentially excluded by biomolecules. Lyotropic ions have the effect of stabilizing biomolecules, favoring nonspecific association among individual elements of mixtures. Strongly lyotropic ions usually decrease solubility of large biomolecules. Examples of lyotropic salts include ammonium sulfate, potassium phosphate, and sodium citrate, among others. Pyrophosphate anions are lyotropic. Salts that represent intermediates in the Hofmeister series tend to have moderate or little influence on stability, association-dissociation, or solubility on biomolecules. Examples include so-called neutral salts such as sodium chloride and potassium chloride. To the extent that such salts may affect stability, association-dissociation, or solubility, their influence is mediated predominantly through coulombic (electrostatic) forces.

The term "multivalent metal cation" refers to the positively charged ionic form of a metal where the net charge of the ion is two or greater. Multivalent metal cations include calcium, magnesium, and zinc, all of which have a net charge of 2+, and ferric iron with a net charge of 3+, among other metal species with similar or different valencies. All of these ions have an affinity for nucleic acids which they bind through coordination bonds. Coordination bonds are 15-60 times stronger than ionic bonds, which means that binding of multivalent metal cations to nucleic acids or other biomolecules persists even at saturating concentrations of salts. Multivalent metal cations can be problematical in the purification of RNA because they can promote formation of dsRNA sequences or stabilize existing dsRNA sequences. They can also promote formation of complexes or stabilize existing complexes (associations), among multiple RNA molecules, between RNA and DNA molecules, and among RNA, DNA, and protein contaminants.

The term "chelating agent," in the context of the method of the invention, refers to a molecule with the ability to form such strong coordination bonds with multivalent metal cations that they are able to competitively remove those metal ions from previously-existing associations with biomolecules, including nucleic acids, including mRNA.

The term "nuclease" or "nuclease enzyme" refers to proteins that have the ability to cleave the chains of nucleic acids and essentially cut them into tiny pieces, ideally into individual nucleotides, doublets, or triplets. They can be classified into three major classes: DNAse enzymes that lyse DNA, RNAase enzymes that lyse RNA, and general nucleases that lyse both DNA and RNA. General nucleases and RNAses are to be strictly avoided because they will destroy the ssRNA product. DNAses are often used to simplify RNA purification by destroying the DNA plasmid template used to produce mRNA. Most DNAse enzymes require the use of a multivalent metal cation co-factor to function properly. Multivalent metal cations can interfere with RNA purification as noted above.

The term "protease" or "proteinase" or "proteolytic enzyme" refers to a protein that has the ability cut other proteins into fragments. This is sometimes used as a method of reducing protein contamination ahead of chromatography steps that might be burdened by such contamination. Many proteases, such as trypsin, require a multivalent metal cation co-factor to function properly. Multivalent metal cations can interfere with RNA purification as noted above. Proteases commonly employed for purpose of breaking down proteins include proteinase K, which provides good results even in the absence of a multivalent metal cation co-factor.

The following series of general non-limiting descriptions of basic method options illustrates variations in how the method may be performed and provides a platform for more detailed discussion of operational variables. It is understood that the buffer conditions mentioned in each of these scenarios are intended to provide a general idea of how the method may be practiced. It is understood that optimization of buffer formulations will be required to accommodate ssRNA species of different sizes and with different contaminant loads.

In one embodiment, a solid phase bearing a mixture of primary amino groups and secondary amino groups in the form of a chromatography device such as a monolith is equilibrated to a pH value close to neutrality, such as 50 mM Hepes, pH 7.0±0.5. A sample containing a mixture of dsRNA and ssRNA is equilibrated by buffer exchange to 50 mM Hepes, pH 7.0±0.5. The chromatography device is then eluted with a linear gradient from the equilibration buffer to an endpoint buffer of 50 mM Hepes, 100 mM tetrapotassium pyrophosphate, pH 7.0±0.5 over 100 device volumes. This approach may be particularly useful for qualifying the suitability of different chromatography media or separating multiple sizes of ssRNA. It will also be useful for revealing the elution behavior of dsRNA, DNA fragments, and proteins relative to ssRNA. This approach may also be used as starting point for development of conditions for preparative separations. Results from this initial run will identify the minimum pyrophosphate concentration required to elute the ssRNA of interest, and provide a preliminary estimate of the gradient slope that will support the best separation of ssRNA from contaminants.

In a related embodiment, a solid phase bearing a mixture of primary amino groups and secondary amino groups may be loaded with the same conditions then washed with a solution of 50 mM Hepes, 3 M guanidine-HCl, pH 7.0±0.5 to more effectively eliminate the majority of dsRNA, DNA, and protein contamination in advance of eluting the desired ssRNA product. After removing the dsRNA, DNA, and proteins, the guanidine-HCl added to enhance their elimination is itself removed by a follow-on wash lacking guanidine-HCl so that pyrophosphate gradient elution of ssRNA begins in the absence of excess salt. In a closely related embodiment, the concentration of guanidine may be increased to 6 M. In another closely related embodiment, 3 M guanidine-HCl may be replaced by 2 M guanidine thiocyanate or a higher concentration of guanidine thiocyanate up to 12 M. Comparison of results with the previously-described embodiment will permit evaluation of the extent to which the chaotropic wash improves the purity of the ssRNA. In a related embodiment representing an extension of the above series, a chelating agent such as but not limited ethylenediaminetetraacetic acid (EDTA) at a concentration of 2 mM to 100 mM may be combined with guanidine, with the intention of dissociating metal-stabilized complexes and displacing the majority of non-ssRNA species from the solid phase in advance of eluting the ssRNA. After removing the majority of dsRNA, DNA, and proteins, the guanidine-EDTA added to enhance their elimination is itself be removed by a follow-on wash lacking excess salt so that pyrophosphate gradient elution of ssRNA begins in the absence of excess salts. Comparison of results with the two previously-described embodiments will permit evaluation of the extent to which the chaotrope-chelator wash improves the purity of the ssRNA. In a closely related embodiment, the chaotrope can be combined with citrate instead of EDTA, or with EGTA, or with a combination of chelating agents.

In other related embodiments, washes with other salt species or combinations of salt species at various pH values may be evaluated to maximize clearance of proteins and dsRNA in advance of eluting the ssRNA. The underlying concept will to apply the highest concentration of the most chaotropic salt at the highest pH that does not cause elution of ssRNA, with the notion that such conditions are likely to remove the largest subset of undesired contaminants in advance of eluting the desired ssRNA. Lower chaotrope concentrations can be evaluated in subsequent experiments if desired.

In some embodiments, the slope of a linear pyrophosphate gradient may be modified to alter the degree of separation among species eluting in that gradient, or particularly to improve fractionation among ssRNA molecules of different sizes. If eluting with a pH gradient of 10 device volumes does not produce the desired degree of separation, its duration may be extended to 20 device volumes, or 50, or 100 device volumes or more.

In some embodiments, the increase of pyrophosphate anions to elute the desired ssRNA and separate it from other contaminants may be conducted in steps. If contaminants have been sufficiently reduced in the previous wash steps, then the ssRNA can be eluted in a single step for the purpose of simplifying the method and obtaining the eluted ssRNA at the highest possible concentration and in the lowest possible volume. Step elution may alternatively be conducted in a succession of step of increasing pyrophosphate. The individual steps may be relatively modest or they may be large according to the needs of a particular preparation. In some embodiments, the gradient may be conducted in a single step.

In one embodiment, the sample and chromatography device are equilibrated with a concentration of pyrophosphate anions that prevents the majority of dsRNA from binding so that it flows through the device and is thereby eliminated in advance of eluting ssRNA with a higher concentration of pyrophosphate.

Many methods of equilibrating samples to the conditions for loading them onto chromatography columns are known to persons of skill in the art. Any of these methods may be employed without altering the true nature of the method. Among these methods are the laboratory-scale method of dialysis, the method of diafiltration with tangential flow filtration membranes, and the method of buffer exchange chromatography. In some cases, adequate sample equilibration may be achieved by titrating the sample to the target pH and, if necessary, diluting the sample with water or with a low-salt or non-salt containing buffer.

Nucleic acids, including mRNA, are known to have a high affinity for multivalent metal cations. They form strong associations with each other principally through coordination bonding between the metal ions and the negatively charged phosphatidic acid residues along the backbone of nucleic acids. Calcium and magnesium are both known to participate in such interactions and both are divalent metal cations, having a charge of 2+. Ferric iron, a trivalent cation with a charge of 3+, interacts even more aggressively with nucleic acids. At each point where any one of these ions interacts with a nucleic acid, it neutralizes an equivalent number of negative charges. This creates a superficial expectation that the negative charge on a given mRNA molecule would be reduced and weaken the interaction of the mRNA with an anion exchanger. Experimental data show that this expectation is not met. Instead, addition of multivalent metal cations typically results in the formation of non-specific cross-links that cause ssRNA to form large aggregates that do not elute from the chromatography device.

Since multivalent cations are commonly present in mRNA preparations, it is recommended that steps be taken in all embodiments to reduce the content and preferably eliminate multivalent metal cations entirely from samples before loading them onto the chromatography device; or at least take steps to remove them before the device is eluted with the pyrophosphate gradient. There are at least two additional reasons for removing them in advance. The first reason is that they may tend to promote formation or stabilization of intrachain and interchain dsRNA sequences. The second reason is that metal ions stabilize non-specific associations between nucleic acids and proteins, essentially forming a stable bridge between them. Since coordination bonds range from 15 to 60 times stronger than ionic bonds, coordination complexes easily survive exposure to even saturating levels of non-metal salts, including NaCl and guanidinium salts. This makes extraction of multivalent metal cations, so far as possible, essential to obtain the highest ssRNA purity and recovery from the method of the invention. Given effective extraction of multivalent metal cations, effective dissociation of nucleic acid-protein complexes can be achieved with high concentrations of chaotropic salts such a guanidinium salts, and to a lesser degree with high concentrations of non-chaotropic salts such as NaCl. Lyotropic salts are likely to impose a contrary influence. As a general matter, chaotropic salts will be preferred because they are less likely to form precipitates, including precipitates of which ssRNA is a component.

In some embodiments where chelator or chelator-high-salt dissociation of nucleic acid-metal-contaminant complexes is performed during sample preparation and/or a chelating or chelating-high salt wash is performed, it may be followed by a washing step that is free of salts beyond the agents used to provide pH control.

In other embodiments, chelating agents and high salt concentrations may be maintained during elution of the ssRNA by increasing pyrophosphate concentration. In other embodiments, the chelating agent may be eliminated or used at a reduced concentration while the high salt is maintained. In other embodiments the high salt may be used at a reduced concentration or eliminated while the chelating agent is maintained.

A particular benefit of the invention is that its ability to remove DNA plasmids from ssRNA preparations makes it unnecessary to perform nuclease digestion of an in vitro transcription mixture, or partially purified in vitro transcription mixture. This has disproportionately high value because nuclease digestion requires addition of magnesium ions (multivalent metal cations) in order for the enzyme to be active. Those magnesium ions potentially contribute to cross-linking of the desired ssRNA, with itself and with other sample components, with the practical result that the recovery of the desired ssRNA product is reduced. By making nuclease digestion unnecessary, addition of magnesium ions becomes unnecessary, and recovery of ssRNA is not compromised.

To the extent that nuclease digestion might be desired despite the ability of the method of the invention to separate plasmid DNA from ssRNA, digestion may be performed then an excess of chelating agent added to the sample before loading the chromatography device. The device can be washed after sample application with an excess of chelating agent. In one such embodiment, following nuclease digestion of plasmid DNA in the presence of 5 mM nuclease enzyme, 10 mM to 50 mM EDTA may be added to the sample. The buffer used to equilibrate and wash the column may also include 10 mM to 50 mM EDTA. In some such embodiments, the concentration of EDTA may be in the range of 1 mM to 100 mM, 5 mM to 75 mM, or 10 mM to 50 mM, or 20 mM to 25 mM, or a higher, lower, or intermediate range.

In one embodiment beginning with an in vitro transcription mixture not digested with DNAse, EDTA is added to a final concentration of 10 mM. Sample pH is neutralized if necessary and the sample can is filtered if necessary to remove solids. It is then loaded to a solid phase bearing a mixture of primary amino groups and secondary amino groups equilibrated to 50 mM Tris, 100 mM NaCl, 10 mM EDTA, pH 7.5. After sample loading, the device is washed with 50 mM Tris, 1.5 M guanidine thiocyanate, 20 mM EDTA, pH 7.5 for 10-20 device volumes. The column is then washed with 50 mM Tris, pH 7.5 to flush guanidine thiocyanate and EDTA out of the device and prepare for elution of the ssRNA. The ssRNA is then eluted with a 50 device volume linear gradient to 50 mM Tris, 100 mM pyrophosphate, pH 7.5. In one closely related embodiment, EDTA is replaced with citrate. In a different closely related embodiment, 1.5 M guanidine thiocyanate is replaced with 3.0 M guanidine-HCl.

In one embodiment representing an extension of the above embodiment, ssRNA prepared by the method of the invention is applied to an Oligo dT affinity chromatography device for final purification and to remove residual pyrophosphate.

In another embodiment representing an extension of the above embodiment, ssRNA prepared by the method of the invention is applied to a hydrophobic interaction chromatography device for final purification and to remove residual pyrophosphate.

In one embodiment beginning with an in vitro transcription mixture, the mixture is precipitated by addition of lithium chloride (LiCl) to a final concentration of 2.0 M to 2.5 M. The supernatant is discarded and the precipitate is resuspended with 50 mM Hepes, 100 mM NaCl, 10 mM EDTA, pH 7.0 and filtered if necessary to remove turbidity. The sample is then loaded to a solid phase bearing a mixture of primary amino groups and secondary amino groups equilibrated to 50 mM Hepes, 100 mM NaCl, 10 mM EDTA, pH 7.0. After sample loading, the device is washed with 50 mM Hepes, 3 M guanidine-HCl, 20 mM EDTA, pH 7.0 for 10-20 device volumes. The column is then washed with 50 mM Hepes, pH 7.0 to flush guanidine and EDTA out of the device and prepare for elution of the ssRNA. The ssRNA is then eluted with a 50 device volume linear gradient to 50 mM Hepes, 100 mM pyrophosphate, pH 7.0. In a closely related embodiment, mRNA is precipitated with NaCl or another salt in place of LiCl. In another closely related embodiment, LiCl precipitation is replaced by ethanol precipitation, for example adding ethanol to a final proportion of about 2.5%.

Industrial process developers often prefer to avoid the use of enzymes because the increase the expense of a process and because anything that is added to the product must later be removed, and testing must be performed to document that it was removed. However, the use of enzymes early in a development program may be an expedient shortcut that permits a company to enter clinical trials earlier, then subsequently develop a more advanced version of the process that does not require the use of enzymes. As noted above, in vitro transcription mixtures are commonly treated with DNAase enzymes to eliminate the DNA plasmid used as a template for production of mRNA. RNA purification may employ proteolytic enzymes to lessen the protein contaminant load in a given in vitro transcription mixture. In some embodiments, an in vitro transcription mixture may be treated first with DNAse to eliminate the majority of the plasmid, and then treated with a proteolytic enzyme such as proteinase K to eliminate the DNAse and the bulk of other protein contaminants in advance of performing the method of the invention. In other embodiments, because the method of the invention makes it unnecessary to employ DNAse, an in vitro transcription mixture may be treated exclusively with proteinase K or with another proteolytic enzyme.

In one embodiment, an in vitro transcription mixture is treated with proteinase K to reduce the protein contaminant load in advance of performing the method of the invention. The sample is filtered through a membrane filter to remove particulates and then loaded to a solid phase bearing a mixture of primary amino groups and secondary amino groups equilibrated to 50 mM Hepes, 100 mM NaCl, 10 mM EDTA, pH 7.0. After sample loading, the device is washed with 50 mM Hepes, 4.0 M potassium chloride, 10 mM EDTA, pH 7.5 for 10-20 device volumes. The column is then washed with 50 mM Tris, pH 7.5 to flush potassium chloride and EDTA out of the device and prepare for elution of the ssRNA. The ssRNA is then eluted with a 50 device volume linear gradient to 50 mM Tris, 100 mM pyrophosphate, pH 7.5.

In one embodiment, an in vitro transcription mixture is treated with 1.5 M guanidine thiocyanate and 20 mM EDTA. The pH is adjusted, if necessary, to 7.0±0.5, and the sample filtered, if necessary, to remove solids. A solid phase bearing a mixture of primary amino groups and secondary amino groups is equilibrated to 50 mM Hepes, 100 mM NaCl, 10 mM EDTA, pH 7.0. After sample loading, the device is washed with 50 mM Hepes, 1.5 M guanidine thiocyanate, 20 mM EDTA, pH 7.0 for 10-20 device volumes. The column is then washed with 50 mM Hepes, pH 7.0 to flush guanidine thiocyanate and EDTA out of the device and prepare for elution of the ssRNA. The ssRNA is then eluted with a 50 device volume linear gradient to 50 mM Hepes, 100 mM pyrophosphate, pH 7.0. The gradient may be performed as a single step, a series of steps, or in a continuous (linear) gradient format.

In one embodiment where ssRNA fails to elute in 100 mM pyrophosphate, the concentration of pyrophosphate may be increased to up to saturation. Tetrasodium pyrophosphate saturates at about 1.51 M. Tetrapotassium pyrophosphate saturates at about 5.66 M. A more moderate approach may be preferred. For example, where 100 mM is not sufficient, increase it by an additional 50 mM, or increase it by an additional 100 mM, and increase it by a larger increment only if necessary.

In one embodiment where ssRNA fails to elute from a solid phase bearing a mixture of primary amino groups and secondary amino groups in a pyrophosphate gradient, the pH may be elevated to a value in the range from pH 8.0 to pH 11.0, or from pH 8.5 to 10.5, or from pH 9 to pH 10, or a higher, lower, or intermediate range of pH. A practical benefit of increasing pH during elution is that it will minimize the amount of pyrophosphate that eventually needs to be removed. Although the method of the invention need not be performed at elevated temperature to elute ssRNA, there is no prohibition against doing so.

In some embodiments, the sample may be equilibrated to an elevated temperatures such as 37° C., 45° C., 56° C., 60° C., 70° C., or an intermediate, higher, or lower temperature in advance of performing the method at ambient temperature.

In some embodiments, the method of the invention may be conducted at elevated temperatures such as 37° C., 45° C., 56° C., 60° C., 70° C., or an intermediate, higher, or lower temperature. In such embodiments, ssRNA will elute at a lower pH than it does at ambient temperature.

In some embodiments, the sample may be equilibrated to an elevated temperature while the method may be performed at either ambient temperature or at an elevated temperature.

In one embodiment, separation of dsRNA from dsRNA by means of adding pyrophosphate anions may be augmented by the presence of a sugar to compete with hydrogen bonding between the ssRNA and the primary amino groups of the solid phase with the expected result of causing ssRNA to elute at a lower pH than in the absence of a sugar. In one such embodiment the sugar is sorbitol, or xylitol, or mannitol, trehalose, or sucrose, or another sugar or combination of sugars. In some such embodiments, the concentration of the sugar may range from 0.1% to 20%, or 1% to 20%, or 5% to 20%, or 10% to 20%, or a value within a higher, lower, or intermediate range. In a related embodiment, separation of dsRNA from dsRNA by means of adding pyrophosphate anions may be augmented by the presence of a chaotrope to compete with hydrogen bonding between the ssRNA and the primary amino groups of the solid phase with the expected result of causing the ssRNA to elute at a lower pH than in the absence of a chaotrope. In one such embodiment the chaotrope is urea. In some such embodiments, the concentration of urea may range from 0.1 M to 10 M, or 1 M to 9 M, or 2 M to 8 M, or 4 M to 6 M, or a value within a higher, lower, or intermediate range.

In another embodiment, separation of dsRNA from dsRNA by means of adding pyrophosphate anions may be augmented by the presence of an alkaline amino acid with the expected result of causing ssRNA to elute at a lower pH than in the absence of an alkaline amino acid. In one such embodiment, the alkaline amino acid is histidine, or histamine, or lysine, or arginine, or another alkaline amino acid or a mixture of alkaline amino acids. In one such embodiment, the concentration of histidine may be in the range of 1 mM to 250 mM, or 10 mM to 250 mM, or 20 mM to 250 mM, or 50 mM to 250 mM, or 100 mM to 250 mM, or a value within a higher, lower, or intermediate range. In another such embodiment, the concentration of lysine may be 1 mM to 10 M, or 10 mM to 10 M, or 100 mM to 10 M, or 1 M to 10 M, or a value within a higher, lower, or intermediate range. In another such embodiment, the concentration of arginine may be in the range of 1 mM to 850 mM, or 10 mM to 850 mM, or 100 mM to 850 mM, or 425 mM to 850 mM, or a value within a higher, lower, or intermediate range.

In one embodiment, the method of the invention may be combined with the method of affinity chromatography using an Oligo dT (OdT) ligand. In one such embodiment, the method of the invention is performed first to remove contaminants that might interfere with the ability of the OdT affinity step to achieve its best results, and to remove pyrophosphate remaining after the method of the invention.

In one embodiment, the method of the invention may be combined with the method of hydrophobic interaction chromatography (HIC). In one such embodiment, the HIC step is performed after the method of the invention so that pyrophosphate can be eliminated by flowing though the HIC column while RNA is retained. In one such embodiment, the hydrophobic ligand on the HIC solid phase may consist of a phenyl group. In another such embodiment, the hydrophobic ligand on the HIC solid phase may consist of a butyl group. In another such embodiment, the hydrophobic ligand on the HIC solid phase may consist of a hexyl group. In other such embodiments, the hydrophobic ligand on the HIC solid phase may consist of a different aliphatic or aromatic group, or a group that embodies both aliphatic and aromatic properties.

In one embodiment, the method of the invention may be combined with the method of reverse phase chromatography (RPC). In one such embodiment, the RPC step is performed after the method of the invention so pyrophosphate can be eliminated by flowing through the RPC column while RNA is retained. In one such embodiment, the hydrophobic nature of the solid phase surface may be conferred by the native hydrophobicity of the styrene divinylbenzene (SDVB) polymer used to synthesis the solid phase. In another such embodiment, the hydrophobic nature of the solid phase surface may be conferred by the hydrophobicity of a ligand affixed to the surface of the solid phase, where that ligand represents an aliphatic hydrocarbon, or an aromatic hydrocarbon, or a ligand of mixed aliphatic-aromatic character.

In one embodiment, the method of the invention may be combined with the method of hydroxyapatite chromatography. In one such embodiment, the hydroxyapatite step is performed after the method of the invention so pyrophosphate can be eliminated by binding it more strongly to the hydroxyapatite than RNA so that the RNA can be recovered by selective elution while the pyrophosphate remains bound. In one such embodiment, the hydroxyapatite is used expressly to exchange pyrophosphate anions for phosphate anions, where the sample containing pyrophosphate is loaded to hydroxyapatite and subsequently eluted with phosphate anions. The same approach may be used with other apatites including fluorapatites and hydroxyapatite fluorapatite hybrids, and apatites including metals other than calcium. In one embodiment, ssRNA containing pyrophosphate anions is added to hydroxyapatite particles in a solution of phosphate sufficient to prevent binding of ssRNA. The solution is mixed to enable the pyrophosphate to be bound to the particles then the particles are removed by filtration or sedimentation, leaving the ssRNA free of pyrophosphate.

In one embodiment, the method of the invention may be combined with affinity chromatography using an Oligo dT ligand and with RPC. In one such embodiment, the method of the invention is performed first so that pyrophosphate levels can be reduced through the course of the two subsequent purification steps.

In one embodiment, the method of the invention may be followed with two other purification steps, or more, so that pyrophosphate levels can be reduced through the subsequent purification steps.

In one embodiment, the method of the invention may be followed with a tangential flow diafiltration step to remove pyrophosphate. In a derivative embodiment, the diafiltered RNA may be processed by one, or two, or three, or more other methods to further remove residual pyrophosphate.

In one embodiment, a pyrophosphatase enzyme may be added to the RNA prepared by the method of the invention to hydrolyze the pyrophosphate into phosphate. Note that addition of the enzyme to the partially purified RNA will require that follow-on processing steps be performed to remove the enzyme. In a derivative embodiment, the pyrophosphatase-treated ssRNA may be processed by one, or two, or three, or more other such processing methods.

Analytical kits for measurement of pyrophosphate content are available commercially. In one embodiment, the method of the invention may be used as an analytical tool to quantitate the amount of ssRNA in a sample. In one such embodiment, a sample at acidic-to-neutral pH may be mixed with a high concentration of a non-pyrophosphate salt so that most non-RNA species fail to bind. The solid phase may then be eluted by an increasing gradient of pyrophosphate. In one such embodiment, after loading the sample onto the solid phase, a dye that interacts with RNA to produce fluorescence may be injected, and the fluorescent dye-RNA complex passed through a fluorescence monitor during elution to amplify the sensitivity of the assay. In one such embodiment, the dye may be Ribogreen.

In one embodiment, the method of the invention may be provided in the form of a kit to facilitate its practice. The kit will include two or more solid phases, at least one of which is a positively charged solid phase dominantly bearing primary amino groups and/or secondary amino groups, and instructions describing the method of the invention. In one such embodiment, a second solid phase would be an Oligo-dT chromatography device. In another such embodiment, a second solid phase would be a hydrophobic interaction chromatography device. In another such embodiment, a second solid phase would be an Oligo-dT chromatography device and a third solid phase would be a hydrophobic interaction chromatography device. In another embodiment, the second and/or third devices may employ solid phases coated with alternative chemistries for purification of RNA.

The invention is further explained by the following non-limiting examples.

EXAMPLES

Example 1

Figure 1:
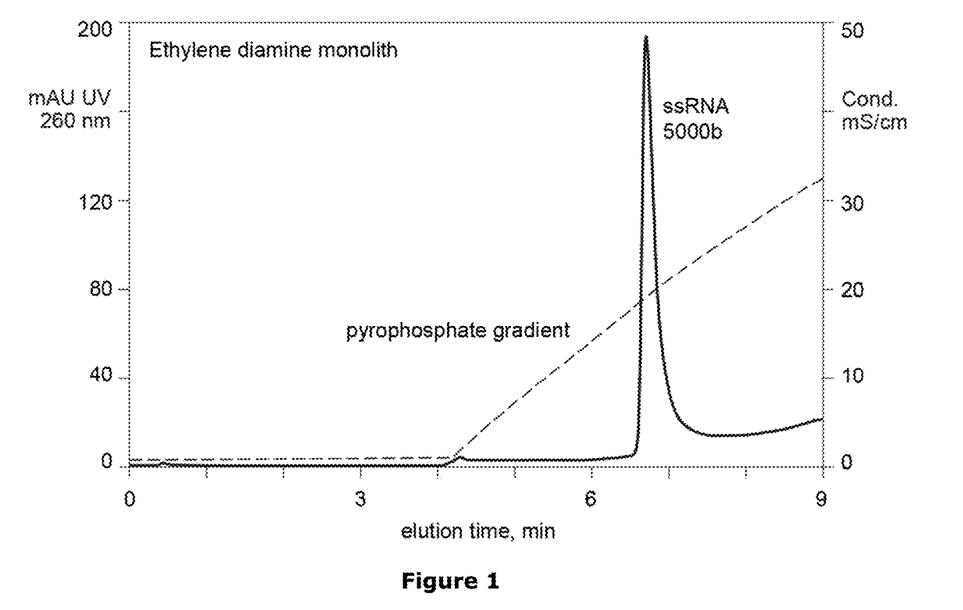
FIG. 1 depicts elution of ssRNA from an ethylene diamine monolith in a pyrophosphate gradient at neutral pH and ambient temperature.

Elution of ssRNA from an ethylene diamine monolith in a pyrophosphate gradient at neutral pH and ambient temperature.

An ethylene diamine monolith was equilibrated with 50 mM Hepes, pH 7.0. A sample of purified ssRNA with a size of 500 bases was applied. The column was washed with equilibration buffer then eluted with a linear gradient to 50 mM Hepes, 100 mM tetrapotassium pyrophosphate, pH 7.0. The ssRNA eluted in a single peak (FIG. 1). The column was subsequently cleaned with 1 M sodium hydroxide (not shown). The experiment was repeated with a diethylaminoethyl anion exchanger and with a quaternary amine anion exchanger. In both cases the majority of the ssRNA remained bound to the anion exchanger and was removed during the 1 M NaOH cleaning step.

Example 2

Figure 2:
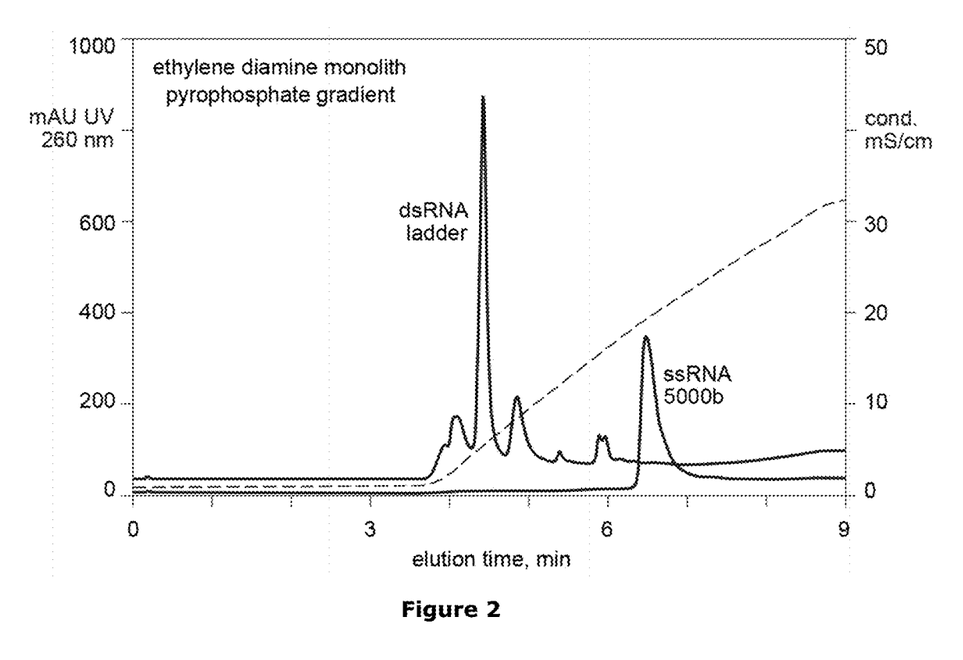
FIG. 2 depicts separation of dsRNA from ssRNA on an ethylene diamine monolith in a pyrophosphate gradient at neutral pH and ambient temperature.

Separation of dsRNA from ssRNA on an ethylene diamine monolith in a pyrophosphate gradient at neutral pH and ambient temperature.

An ethylene diamine monolith was equilibrated with 50 mM Hepes, pH 7.0. A sample containing a mixture of purified ssRNA with a size of 500 bases and a dsRNA size ladder (21b-500b) was applied. The column was washed with equilibration buffer then eluted with a linear gradient to 50 mM Hepes, 100 mM tetrapotassium pyrophosphate, pH 7.0. All dsRNA species eluted in advance of the ssRNA (FIG. 2).

Example 3

Figure 3:
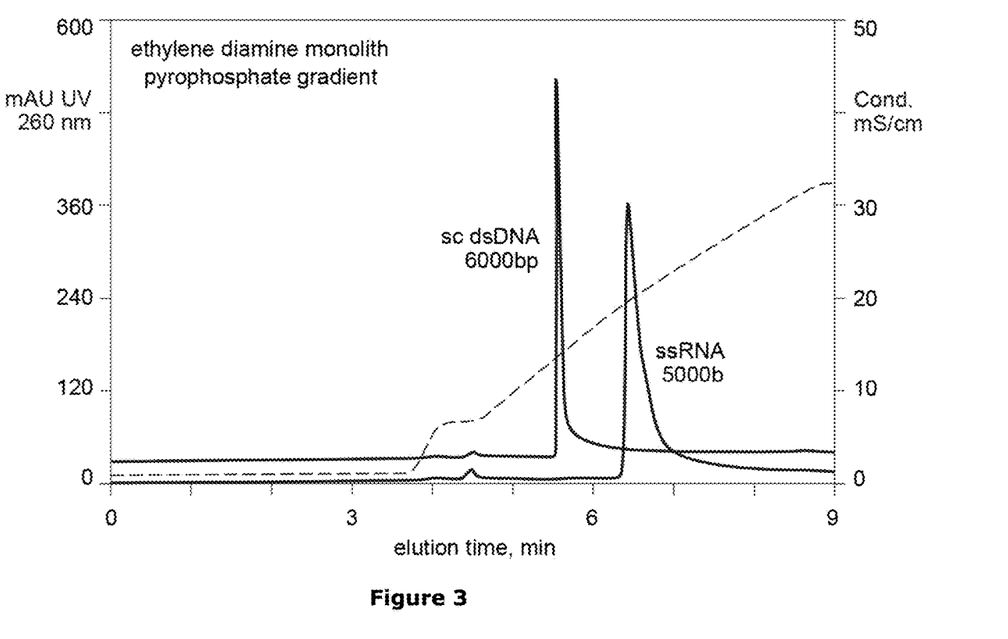
FIG. 3 depicts separation of plasmid DNA from ssRNA on an ethylene diamine monolith in a pyrophosphate gradient at neutral pH and ambient temperature.

Separation of plasmid DNA from ssRNA on an ethylene diamine monolith in a pyrophosphate gradient at neutral pH and ambient temperature.

An ethylene diamine monolith was equilibrated with 50 mM Hepes, pH 7.0. A sample containing a mixture of purified ssRNA with a purified supercoiled (sc) dsDNA plasmid with a size of 6000 base-pairs was applied. The column was washed with equilibration buffer then eluted with a linear gradient to 50 mM Hepes, 100 mM tetrapotassium pyrophosphate, pH 7.0. DNA eluted in advance of and well separated from the ssRNA (FIG. 3).

Example 4

Figure 4:
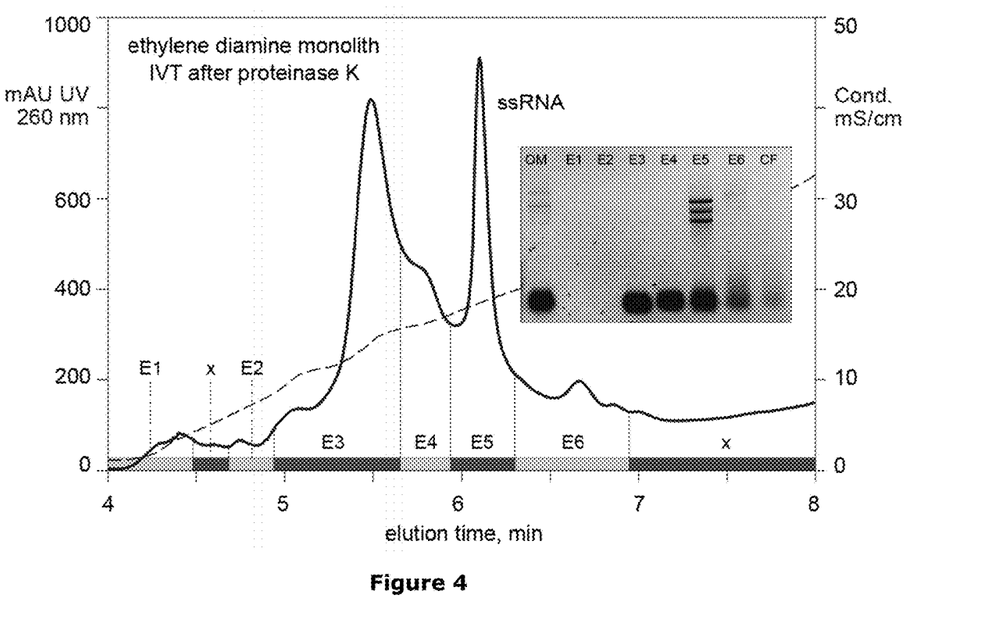
FIG. 4 depicts fractionation of ssRNA from an in vitro transcription mixture on an ethylene diamine monolith in a pyrophosphate gradient at neutral pH and ambient temperature.

Fractionation of ssRNA from an in vitro transcription mixture on an ethylene diamine monolith in a pyrophosphate gradient at neutral pH and ambient temperature.

An in vitro transcription mixture containing ssRNA was treated with proteinase K to reduce protein contamination. The inset of FIG. 4 illustrating results from agarose electrophoresis shows that sample (labeled OM for original material) contained mRNA of 3 sizes, visible as a triplet near the top of the gel. A large population of small RNA fragments is evident near the bottom of the gel. An ethylene diamine monolith was equilibrated with 50 mM Hepes, pH 7.0. Sample was applied. The column was washed with equilibration buffer then eluted with a linear gradient to 50 mM Hepes, 100 mM tetrapotassium pyrophosphate, pH 7.0 (FIG. 4). Analytical agarose electrophoresis showed most of the ssRNA triplet in the sharp elution peak leveled E5. Other fractions were occupied mainly by small RNA. Note that this analytical method does not detect proteins or discriminate RNA-protein aggregates from RNA.

Example 5

Figure 5:
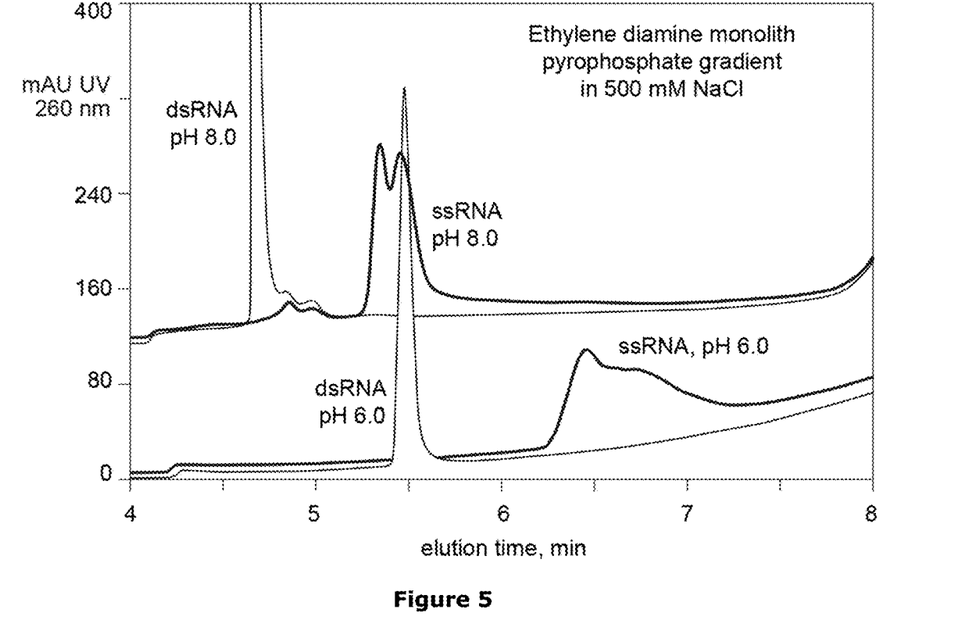
FIG. 5 depicts synergistic effects of pyrophosphate salts, non-pyrophosphate salts, and pH on separation of dsRNA and ssRNA by an ethylene diamine monolith in a pyrophosphate gradient at ambient temperature.

Synergistic effects of pyrophosphate salts, non-pyrophosphate salts, and pH on separation of dsRNA and ssRNA by an ethylene diamine monolith in a pyrophosphate gradient at ambient temperature.

FIG. 5 illustrates overlaid results of four different chromatography runs. Two samples were run under each of two different conditions. The samples were a purified ssRNA with a size of 5000b and a dsRNA ladder with a size range of 20-500b. One pair of chromatography experiments (dsRNA and ssRNA) was run at pH 8.0, where the ethylene diamine column was equilibrated with 50 mM Tris, 500 mM KCl, pH 8.0, loaded, then washed with equilibration buffer prior to elution in a linear gradient to 50 mM Tris, 100 mM tetrapotassium pyrophosphate, 500 mM KCl, pH 8.0. A parallel experiment was run at pH 6.0, where the ethylene diamine column was equilibrated with 50 mM MES, 500 mM KCl, pH 6.0, loaded, then washed with equilibration buffer prior to elution in a linear gradient to 50 mM MES, 100 mM tetrapotassium pyrophosphate, 500 mM KCl, pH 6.0. Results are illustrated in FIG. 5. In both cases, dsRNA eluted in advance of ssRNA. Resolution between the dsRNA and ssRNA in 500 mM NaCl at pH 8.0 was slightly better than obtained at pH 7.0 in the absence of NaCl. Note also that where the dsRNA size ladder was separated into multiple populations at pH 7.0 in the absence of NaCl, at pH 8.0 in 50 mM NaCl, most of the dsRNA subsets eluted in a single peak with only two minor components eluting later. Note further that ssRNA was separated into two apparent peaks, with the earlier peak exhibiting a smaller size distribution. Separation of dsRNA from ssRNA was improved significantly at pH 6.0 in NaCl. The dsRNA eluted in a single peak far-separated from ssRNA. The ssRNA profile at pH 6.0 suggests that there were more subpopulations within the ssRNA elution than were suggested by the elution profile at pH 8.0. These results have several important process ramifications. They recommend a pH of 6 over pH 7 or 8 for increasing the degree of separation between dsRNA and ssRNA. They recommend the use of a non-pyrophosphate salt during the pyrophosphate gradient to achieve better separation of ssRNA subsets. They further suggest the utility of applying a high-salt wash in advance of pyrophosphate elution to clear the majority of protein, DNA, and dsRNA contaminants in advance of pyrophosphate elution. Such a high salt wash might include 1 M to 4 M sodium chloride or potassium chloride, or 1 M to 4 M guanidine-HCl or guanidine isothiocyanate.

Example 6

Figure 6:
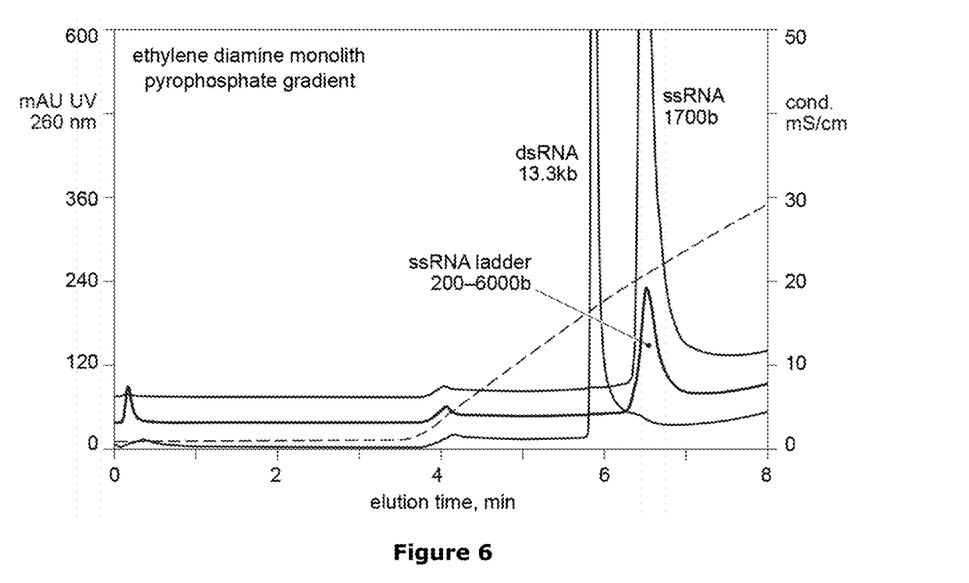
FIG. 6 depicts separation of very-large dsRNA from small-to-large ssRNA in a pyrophosphate gradient.

Separation of very-large dsRNA from small-to-large ssRNA in a pyrophosphate gradient. Extreme worst-case conditions were simulated by comparing the degree of separation obtained between very-large dsRNA and small-to-large ssRNA. In authentic in vitro transcription mixtures, dsRNA and ssRNA would contain the same number of bases. The larger the number of bases, the later dsRNA is expected to elute, which should cause it to elute closer to ssRNA. An ethylene diamine monolith was equilibrated with 50 mM Hepes, pH 7.0. In one experiment, dsRNA with a size of 13.3 kB was applied. In another experiment, ssRNA with a size of 1700b was applied. In another experiment, an ssRNA lader containing subpopulations with sizes ranging from 200b to 6 kb was applied. Thus the size of dsRNA ranged from slightly more than twice the number of bases in the ssRNA (13.3 kb versus 6 kb) to 15 times more bases (13.3 kb versus 200 b). After sample application, the column was washed with equilibration buffer then eluted with a linear gradient to 50 mM Hepes, 100 mM tetrapotassium pyrophosphate, pH 7.0. Results are shown in FIG. 6. All ssRNA sizes eluted at about the same point, well separated from the main body of the dsRNA peak.

Example 7

Figure 7:
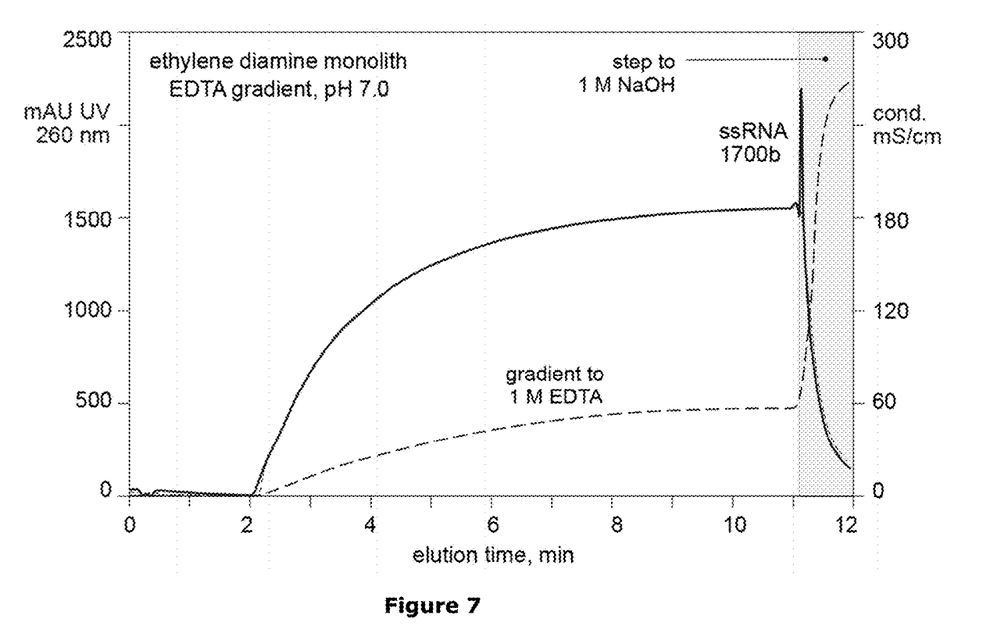
FIG. 7 depicts the inability of an alternative tetravalent anion to elute ssRNA from a mixed primary-secondary amine solid phase.

Inability of an alternative tetravalent anion to elute ssRNA from a mixed primary-secondary amine solid phase. ssRNA with a size of 1700 b was applied to an ethylenediamine (mixed primary-secondary amino) solid phase equilibrated to 20 mM Hepes, pH 7.0. The column was washed after sample application with equilibration then eluted with a linear gradient to 1 M ethylenediaminetetracetate. The solid phase was subsequently cleaned and sanitized with 1 M sodium hydroxide (pH 13). As shown in FIG. 7, ssRNA did not elute in the gradient. It was removed from the column only by sodium hydroxide. These results demonstrate that the ability of pyrophosphate to elute ssRNA from primary-secondary amine solid phases does not reside in their tetravalency. Otherwise, ethylenediaminetetracetate would have been expected to elute ssRNA as effectively as pyrophosphate.

Example 8

Figure 8:
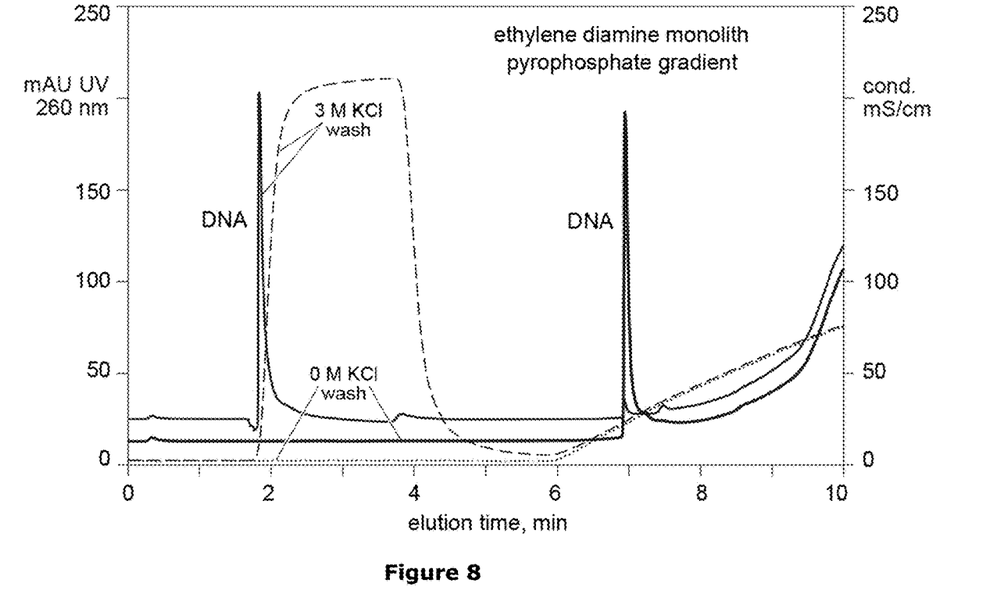
FIG. 8. Advance removal of DNA with a non-pyrophosphate salt wash compared with elution in a pyrophosphate gradient.

Advance removal of DNA with a non-pyrophosphate salt wash compared with elution in a pyrophosphate gradient.

Separation of DNA from ssRNA in a pyrophosphate gradient is a valuable trait, but removing DNA in advance of the pyrophosphate gradient is arguably even more valuable since it increases the degree of separation. A control experiment was performed in which a DNA plasmid was eluted from an ethylenediamine (mixed primary-secondary amine) solid phase with a linear pyrophosphate gradient. The column was equilibrated to 50 mM Hepes, pH 7.0. Sample was injected. After sample application, the column was washed with equilibration buffer then eluted with a linear gradient to 50 mM Hepes, 100 mM tetrapotassium pyrophosphate, pH 7.0. Another run was conducted in which the column was equilibrated, sample was applied, and the column was washed as in the control experiment. A second wash was applied of 50 mM Hepes, 3 M potassium chloride, pH 7.0, then a third wash with equilibration buffer to clear the excess potassium chloride. The column was then eluted as in the control experiment. DNA eluted in the pyrophosphate gradient as expected in the control experiment but it was removed in advance by the salt wash so that it was mostly absent from the pyrophosphate gradient profile (FIG. 8). In other experiments, dsRNA and proteins behaved the same way as DNA. In other experiments, similar results were obtained when potassium chloride was substituted with guanidine-HCl. In other experiments, 1 M potassium chloride was not full achieve advance removal of DNA or dsRNA.

Example 9

Utilization of non-pyrophosphate salts and pH in conjunction with pyrophosphate gradients. A solid phase bearing a mixture of primary amino groups and secondary amino groups in the form of a chromatography device such as a monolith is equilibrated to 50 mM MES (morpholinoethanesulfonic acid) at pH 6.0±0.5. A sample of in vitro transcription mixture containing ssRNA is titrated to 6.0±0.5 and filtered to remove turbidity. The sample is applied to the chromatography device. The sample is washed with 50 mM MES, 2 M guanidine thiocyanate, 20 mM EDTA, pH 6.0±0.5 for 10 device volumes with the result of removing the majority of dsRNA, DNA, and protein contamination. Guanidine and EDTA are removed by washing with equilibration buffer. The chromatography device is eluted with a linear gradient to 50 mM MES, 100 mM tetrasodium pyrophosphate, pH 6.0. Trace levels of dsRNA, DNA, and protein remaining after the guanidine-EDTA wash elute in advance of the ssRNA. The column is cleaned and sanitized by 1 M sodium hydroxide optionally combined with 2 M sodium chloride. The method is practiced in a parallel manner on a primary amine or polyethyleneimine chromatography device.

Example 10

Utilization of non-pyrophosphate salts and pyrophosphate salts conjunction with pH gradients.

A solid phase bearing a mixture of primary amino groups and secondary amino groups in the form of a chromatography device such as a monolith is equilibrated 20 mM Tris, 20 mM bis-tris-propane, pH 8.5. A sample of partially purified ssRNA is titrated to pH 8.5 and injected onto the device. The sample is injected and the device is washed with 20 mM Tris, 20 mM bis-trispropane, 3 M guanidine-HCl, 20 mM EDTA, pH 8.5 to displace the majority of the dsRNA, DNA, and protein contamination. The device is washed with equilibration buffer to guanidine and EDTA. The ssRNA is eluted with a linear pH gradient ending at 20 mM Tris, 20 mM bis-tris-propane, 10 mM tetrapotassium pyrophosphate, pH 10.5. Trace levels of dsRNA, DNA, and protein remaining after the guanidine-EDTA wash elute in advance of the ssRNA. The column is cleaned and sanitized by 1 M sodium hydroxide optionally combined with 2 M sodium chloride.

Example 11

Utilization non-pyrophosphate salts in conjunction with gradients of pyrophosphate salts, non-pyrophosphate salts, and pH.

A solid phase bearing a mixture of primary amino groups and secondary amino groups in the form of a chromatography device is equilibrated with 50 mM MES, pH 6.0±0.5. A sample of in vitro transcription mixture containing ssRNA is titrated to 6.0±0.5 and filtered to remove turbidity. The sample is applied to the chromatography device. The sample is washed with 50 mM MES, 2 M guanidine isothiocyanate, 20 mM EDTA, pH 6.0±0.5 for 10 device volumes with the result of removing the majority of dsRNA, DNA, and protein contamination. Guanidine and EDTA are removed by washing with equilibration buffer. The chromatography device is eluted with a linear gradient to 50 mM Hepes, 500 mM potassium chloride, 100 mM tetrapotassium pyrophosphate, pH 8.0±0.5. Trace levels of dsRNA, DNA, and protein remaining after the guanidine-EDTA wash elute in advance of the ssRNA. The column is cleaned and sanitized by 1 M sodium hydroxide optionally combined with 2 M sodium chloride.

REFERENCES

All references cited herein are incorporated by reference to the full extent to which the incorporation is not inconsistent with the express teachings herein.

[1] M Baiersdorfer, G Boros, H Murumatsu, A Mahini, I Vlatkovic, U Sahin, K Kariko, A fascile method for the removal of dsRNA contaminant from in vitro-transcribed mRNA, Molecular therapy: nucleic acids, 15 (2019)

[2] S. Urayama, Y. Yoshida-Takashima, M. Yoshida, Y. Tomaru, H. Moriyama, K. Takai, T. Nunoura, A New Fractionation and Recovery Method of Viral Genomes Based on Nucleic Acid Composition and Structure Using Tandem Column Chromatography. Microbes Environ. 30, (2015) 199-203.

[3] R. Franklin, Purification and properties of the replicative intermediate of the RNA bacteriophage R17. Proc. Natl. Acad. Sci. USA 55, (1966) 1504-1511.

[4] A Nwokeoji, A W Kung, P Kilby, D Portwood, M Dickman, Purification and characterization of dsRNA using ion pair reverse phase chromatography and mass spectrometry, J. Chromatography A 1484 (2017) 14-25.

[5] A Nwokeoji, M Earll, P Kilby, D. Portwood, M. Dickman, High resolution fingerprinting of double-stranded RNA using ion-pair reversed phase chromatography, J. Chromatography B 1104 (2019) 212-219.

[6] K Kariko, H Muramatsu, J Ludwig, D. Weismann, Generating the optimal mRNA for therapy: HPLC purification eliminates immune activation and improves translation of nucleoside-modified, protein-encoding mRNA, Nucleic acid research, 39 (2011) e142.

[7] D. Weismann, N. Pardi, H Murumatsu, K Kariko, HPLC purification of in vitro transcribed long RNA, Methods Molecular Biology, 969 (2013) 43-54.

[8] A Romanovskaya, L P Sarin, D H Bramford, M M Poranen, High-throughput purification of double-stranded R.N.A. molecules using convective interaction media monolithic anion exchange columns, J. Chromatography A, 1278 (2013) 54-60.

[9] WO 2014/144767 A1

The invention claimed is:

1. A method of single-stranded RNA purification comprising the steps:
   applying a sample containing single-stranded RNA to a solid phase comprising a surface bearing both primary and secondary amino groups under conditions sufficient to bind at least predominantly the single-stranded RNA; and
   eluting the single-stranded RNA adsorbed on the surface by means of a pyrophosphate gradient with an elution buffer having a pyrophosphate concentration in the range of 1 mM to 1000 mM.

2. The method of claim 1 wherein after applying the sample and prior to eluting of the single-stranded RNA at least one step of washing of the solid phase is provided with a washing buffer comprising non-pyrophosphate salts at a higher ionic strength compared to the ionic strength of the elution buffer.

3. The method of claim 1 wherein the molar ratio of primary amino groups to secondary amino groups is in the range of 1/10 to 10/1.

4. The method of claim 1 wherein desorbing of double-stranded RNA adsorbed on the surface of the solid phase is achieved by means of a buffer having a lower concentration of pyrophosphate anions than needed for eluting single-stranded RNA.

5. The method of claim 1 wherein eluting of the single stranded RNA from the solid phase occurs at a pyrophosphate concentration in the range of 1 mM to 500 mM.

6. The method of claim 1 wherein the pyrophosphate is applied in a buffer as a gradient from a lower concentration to a higher concentration, and wherein the elution buffer has a pH of 5.5 to 8.5.

7. The method of claim 1 wherein a chelating agent is present in the sample.

8. The method of claim 1 wherein a chelating agent is present in an environment of the surface of the solid phase prior to the contacting of the sample.

9. The method of claim 7 wherein the chelating agents are independently selected from the group consisting of ethylenediaminetetraacetic acid (EDTA), ethylene glycol-bis(2-aminoethylether)-N,N,N',N'-tetraacetic acid (EGTA), tris(2-aminoethyl)amine, phosphoric acid, citric acid, and combinations thereof.

10. The method of claim 2 wherein the washing buffer comprises a chaotropic salt.

11. The method of claim 1 wherein the desired single-stranded RNA is of size in the range of 1000 bases to 25,000 bases.

12. A method of single-stranded RNA purification comprising the steps:
    applying a sample containing single-stranded RNA at a pH in the range of 5.5 to 8.5 to a solid phase comprising a surface bearing both primary and secondary amino groups; and
    eluting the single-stranded RNA adsorbed on the surface by means of an increasing pyrophosphate gradient with an elution buffer having a pyrophosphate concentration in the range of 10 mM to 150 mM.

13. The method of claim 12 further comprising using an elution buffer that has a higher pH than the sample.

14. The method of claim 12 wherein after applying the sample and prior to eluting of the single-stranded RNA at least one step of washing of the solid phase is provided with a washing buffer comprising non-pyrophosphate salts at a higher ionic strength compared to the ionic strength of the elution buffer.

15. The method of claim 3 wherein the molar ratio of primary amino groups to secondary amino groups is selected from the group of ranges consisting of 2/10 to 10/2, 3/10 to 10/3, 4/10 to 10/4, and 5/10 to 10/5.

16. The method of claim 5 wherein eluting of the single stranded RNA from the solid phase occurs at a pyrophosphate concentration in the range of 1 mM to 200 mM.

17. The method of claim 2 wherein the ionic strength of the washing buffer is in the range selected from the group of ranges consisting of 0.5 M to 12 M, 1 M to 12 M, 2 M to 12 M, 4 M to 12 M, and 6 M to 12 M.

18. The method of claim 10 wherein the chaotropic salt is selected from the group consisting of guanidinium salts, thiocyanates, perchlorates and combinations thereof.

19. The method of claim 1 wherein the surface bears covalently attached groups consisting essentially of the primary and secondary amino groups.

20. The method of claim 1 wherein the surface is essentially absent tertiary amino groups, quaternary amino groups, and negatively charged residues.

* * * * *